May 18, 1965 W. SIEGEL 3,183,555
LOCKING MEANS FOR THE MOLD CLOSING PLATE OF
INJECTION MOLDING MACHINES
Filed June 20, 1962 3 Sheets-Sheet 1

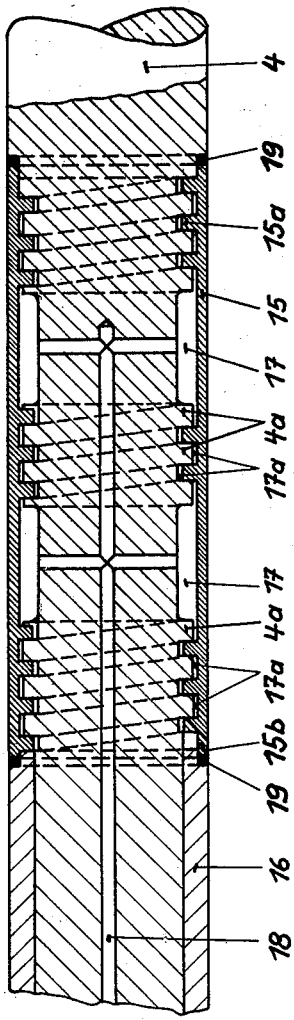
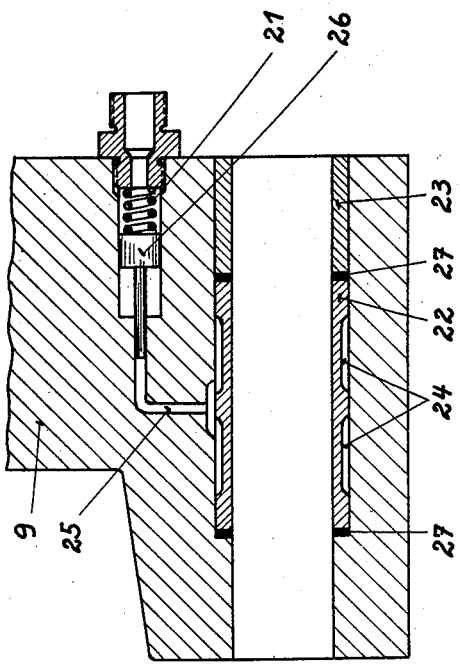

3,183,555
LOCKING MEANS FOR THE MOLD CLOSING PLATE OF INJECTION MOLDING MACHINES

Werner Siegel, Langenfeld, Rhineland, Germany, assignor to Schloemann Aktiengesellschaft, Dusseldorf, Germany
Filed June 20, 1962, Ser. No. 203,775
6 Claims. (Cl. 18—30)

The present invention relates to a pressure moulding or injection moulding machine, in which the mould closing pressure is produced by one or more pressure pads compressing the ejector half and the casting half of the mould, and to a hydraulic fixing device for fixing the mould closing member sliding on guide columns and carrying the ejector half of the mould, in the mould closing position.

In these machines, the locking of the closing member, carrying the ejector half of the mould in the mould closing position is usually effected by mechanical means which require a fixed abutment. There is known, for example, a machine in which the movement of the closing member is effected by a toggle joint which is self-locking in the straight position and the abutment of which is a cylinder, displaceable and lockable in the closing position relative to a stationary piston in the main frame. With another machine, in which the closing member may be moved hydraulically, the closing plate is formed by a cylinder for the closing piston and carries pressure rods guided in guides which are longitudinally adjustable and lockable in the adjusted length. In the closing position, these pressure rods rest against an abutment having apertures and formed by a rotary disc which may be so adjusted in order to open the mould, that the orifices allow the pressure rods to pass therethrough. In a further known injection moulding machine, the closing plate has mechanically or hydraulically operated shell-shaped clamping jaws which embrace the guide columns and engage into notches provided therein. The rigid guide columns form here also the abutment for the closing member locking action. These mechanical locking devices require an adjustment of the locking device and abutment for every mould adjustment, in order to ensure the good closure of the mould. In addition, the abutment must be firmly locked, in order to withstand the mould closing pressure exerted by the pressure pad. Thus, the make-ready of the machine is difficult. Furthermore, with a number of known mechanical locking devices, there is the disadvantage that the locking or adjustment of the closing member can be effected only at certain points provided with notches. In consequence, either the pressure pad must pass through a correspondingly large stroke, or distance pieces must be fitted between the mould base plate and the mould itself.

The invention has the object of eliminating these drawbacks and of providing an arrangement enabling the quick and stepless locking of the closing member in any possible closing position without requiring during the make-ready any special adjustment of the locking mechanism.

According to the invention, this is realized by providing on the guide columns, within the zone carrying the clamping plate carrying the ejector mould half or a closing plate forming part of the closing member and serving as abutment for the pressure plate, clamping bushes forming pressure chambers against the guide columns, or by fitting such clamping bushes in the apertures of the mould clamping plate or closing plate provided for the guide columns, which form pressure chambers against the clamping plate or closing plate, so that by forcing a pressurized medium into these pressure spaces, the clamping bushes may be pressed against the walls of the bores or against the guide columns, whereby the clamping plate or closing plate may be fixed in any desired position by frictional forces receiving the mould closing pressure.

Furthermore, in order to increase the maximum pressure affecting the clamping bushes, there are provided within the supply lines for the pressure medium pressure transformers which may be conveniently slightly biased by a compression spring.

Conveniently the pressure medium is applied simultaneously from a common system, both to the clamping bushes and to the pressure pad producing the mould closing pressure. In this way, the pressure medium supply to the clamping bushes is automatically controlled, because with increasing pressure on the pressure pad, also the pressure in the clamping bushes will rise, causing these to be more strongly urged against their abutments. Thus, the clamping bushes are tightened in accordance with the mould closing pressure so that even with high mould closing pressures the mould clamping plate or the closing plate are firmly held, whilst with low mould closing pressures the stress affecting the clamping bushes is correspondingly smaller.

The invention will be further described, by way of example, with reference to the accompanying drawings, in which:

FIG. 3 is a section of a guide column with a clamping bush screwed on to the column, shown on an enlarged scale;

FIG. 4 is a cross-section of a part of a closing plate wherein the clamping bushes are fitted into the inner walls of bores receiving the guide columns.

Figure 1:
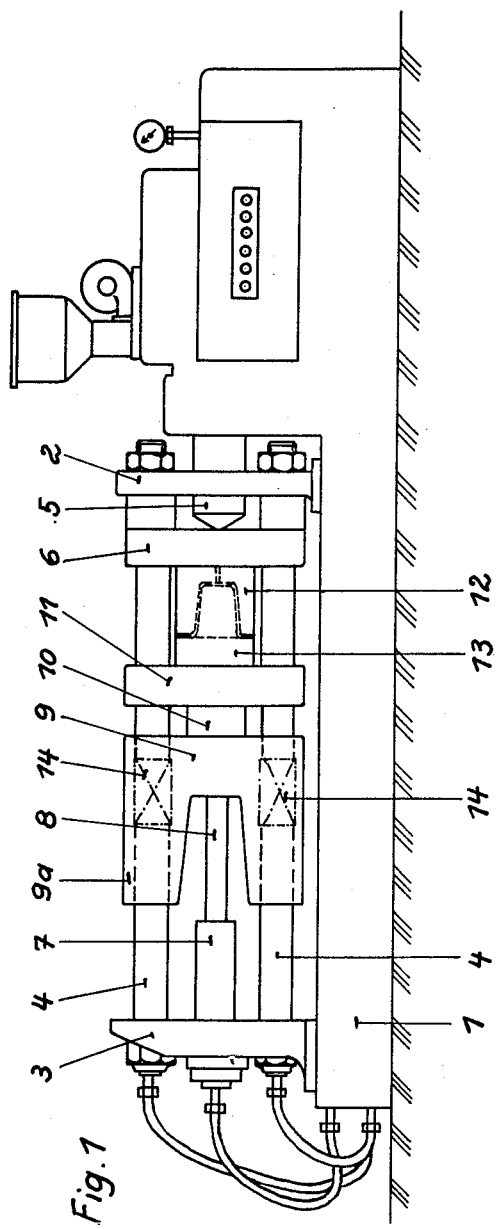
FIG. 1 is a conventional injection moulding machine with a closing member according to the invention.

FIG. 1 shows a conventional injection moulding machine, in which the closing frame comprises two crossheads 2, 3 firmly mounted on a base plate 1 and four fixed guide columns 4 connecting these crossheads. The front crosshead 2, through the centre of which passes the injection cylinder 5, carries a fixed mould clamping plate 6, whilst the rear crosshead 3 carries a displacement cylinder 7, the piston rod 8 of which is connected with a closing plate 9 slidably mounted on the guide columns 4. The closing plate 9 carries on its front side a hydraulically operating pressure pad 10 which is rigidly connected with a movable mould clamping plate 11, slidably mounted on the columns 4. Thus, the closing plate 9, the pressure pad 10 and the movable mould clamping plate 11 form a unit which may be moved by the displacement cylinder 7 and pistons 7, 8 along the guide columns 4, in order to close or to open the mould halves 12, 13 mounted on the mould clamping plates 6 and 11. In order to lock the closing unit 9, 10, 11 in the position nearest to the mould closure, there is provided, according to the invention, a fixing device 14, which may be located either in the locking range of the closing plate 9 on the guide columns 4, or in the bores of the closing plate 9 provided for the guide columns 4.

Figure 2:
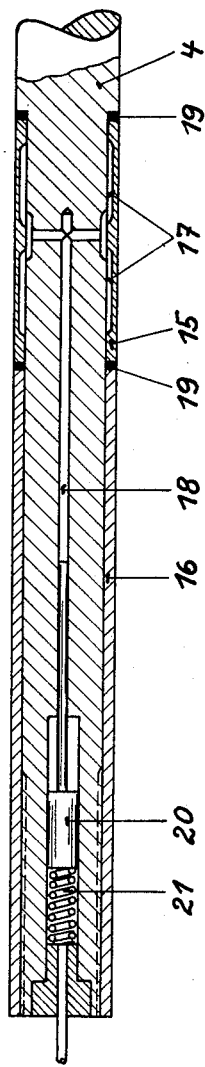
FIG. 2 is an enlarged longitudinal section of a guide column with fitted clamping bush according to the invention and with an internally fitted pressure transformer.

In the embodiment of FIG. 2, the locking device is provided on the guide columns 4. Here, the guide columns 4 are shouldered and carry on the part with smaller diameter a clamping bush 15 which is flush with the outer surface of the guide column and is held in position by a retaining tube 16, screwed on to the smaller diameter section of the column. The clamping bushes 15, consisting of high-grade, highly elastic steel, are thin-walled tubes so that hydraulic chambers are formed between column and bush which may be sealed by sealing rings 19. These hydraulic spaces 17 of each clamping bush 15 communicate through a duct 18, passing through the interior of the column, with the hydraulic system of the machine. By forcing a pressurized medium into the hydraulic spaces 17, the clamping bushes 15 can be expanded and urged against the inner walls of the bores provided in the closing plate 9 for the guide columns 4 so that the closing plate 9 is held on the guide columns by frictional contact.

In order to obtain a sufficiently wide range for the closing plate 9, adaptable to different heights of moulds, the closing plate 9 of the fixing device according to the invention has rearwardly extending extensions 9a in the axial direction of the guide columns 4 (FIG. 1), whereby the bores for the guide columns 4 and the clamping range are considerably extended. In this manner, the closing plate 9 may be locked steplessly and in any desired position.

According to the invention, the pressure medium for the presure pad 10 and the clamping bushes 15 is supplied by the same system. In this way the contact pressure of the clamping bushes 15 is adapted to the mould closing pressure. In order to increase the maximum pressure of the clamping bushes 15, there are provided pressure transformers 20, which are, in the FIG. 2 embodiment with the clamping bushes 15 arranged on the guide columns 4, conveniently mounted within the columns. The pressure transformers 20 are slightly biased by compression springs 21 so that the pressure transformers 20 are always prepared for operation, even when the system is depressurized, in order to eliminate dead travel, when an inlet valve for the pressure medium is opened, and to produce the immediate response of the clamping bushes 15. However, in order to ensure that the clamping bushes 15 are already clamped tight before the pressure caused by the pressure pad 10 and affecting the closing plate 9 becomes operative, there may be provided a delay valve or the like, for example, a slide valve operated by a spring, in the supply line to the pressure pad 10. This slide or valve opens only when the clamping bushes 15 are affected by the minimum pressure necessary to cause the blocking of the closing plate 9. After opening the delay valve or the like, a higher pressure builds up in the pressure pad 10, and the pressure in the clamping bushes 15 will rise simultaneously, so that the closing plate 9 is firmly blocked in accordance with any mould closing pressure.

Since the mould closing pressure causes the pressure pad 10 to rest against the calmped closing plate 9, the clamping bushes 15 pressed against the inner wall of the bores must be able to absorb considerable axial forces. In order to increase their capacity to absorb axial forces, the clamping bushes 15 may, as shown in FIG. 3, have an internal thread 15a and be screwed on to a corresponding external thread 4a of the guide columns. Preferably a square thread is used, because in this case, the perpendicular flanks are not disengaged during the clamping of the clamping bushes 15. Thus, the clamping bushes 15 will be supported over the entire length of the thread even in the clamped position.

The thread may be continuous or, as shown in FIG. 3, interrupted, in order to provide larger hydraulic spaces for the pressure medium. Generally, however, in order to provide the most favourable pressure chamber, ensuring the uniform expansion of the clamping bushes, the thread base between the individual threads may be recessed, forming a helical hydraulic chamber 17a, following the thread. In this case, however, centering lugs 15a are necessary at the ends of the bushes 15.

In order to ensure the quick distribution of the medium, several longitudinal grooves distributed over the circumference and crossing the thread may be provided. Threaded clamping bushes are also sealed only by simple sealing rings 19.

FIG. 4 shows an embodiment in which the clamping bushes according to the invention are mounted in bores of the closing plate 9, adapted to receive the guide columns 4. In this embodiment, the clamping bushes are not expanded circumferentially in order to lock the closing plate, but compressed and firmly urged against the solid guide columns 4. Accordingly, the clamping bushes 22 are here internally smooth, and have on their outer diameter extensions, in order to provide hydraulic spaces 24 adapted to compress the bushes. In order to receive the clamping bushes 22, the bores provided in the clamping plate 9 are widened from the front side of the clamping plate. The clamping bushes 22 are fitted into these widened bores and held in position by retaining tubes 23, also screwed into these bores. The inner diameter of the clamping bushes 22 and of the retaining tubes 23 is equal to the diameter of the unwidened parts of the bore, so that after assembly, there is formed a smooth continuous bore for the guide columns 4. The hydraulic chambers 24 are supplied with pressure fluid through ducts 25 in the closing plate 9, containing, as in the embodiment of FIG. 2, biased pressure transformers 26. The clamping bushes 22 may be provided with sealing rings 27 in the same way as the clamping bushes 15.

In a modification of the FIG. 4 embodiment, the clamping bushes 22 may also be provided with a thread and screwed into the bores of the closing plate 9, in order to provide a firmer seating and a better absorption of axial forces. For the reasons outlined above, also here square threads are used. However, a disadvantage of the FIG. 4 embodiment is that flexible hoses must be provided for supplying the pressure fluid to the moving closing plate 9. This is technically possible without difficulty, because the pressure transformer 26 supplying the high pressure is provided within the closing plate 9 and the hoses carry only the normal pressure of the system. An advantage of this embodiment is that the closing plate 9 can be locked at any point of its travel and that it requires no or only very short rearward extensions 9a. The closing plate is therefore narrower, and the over-all travel, for opening or closing the mould, is longer, or the machine may be shorter.

Since the expansion of the clamping bushes 5, or the compression of the bushes 22, requires a very high pressure, and therefore a highly pressurized hydraulic medium, a viscous, possibly even a pasty medium is used. With the use of this possibly pasty hydraulic medium, which need be used only downstream of the pressure transformers 20, 26, a simple sealing ring 19 or 27 is sufficient.

Figure 5:
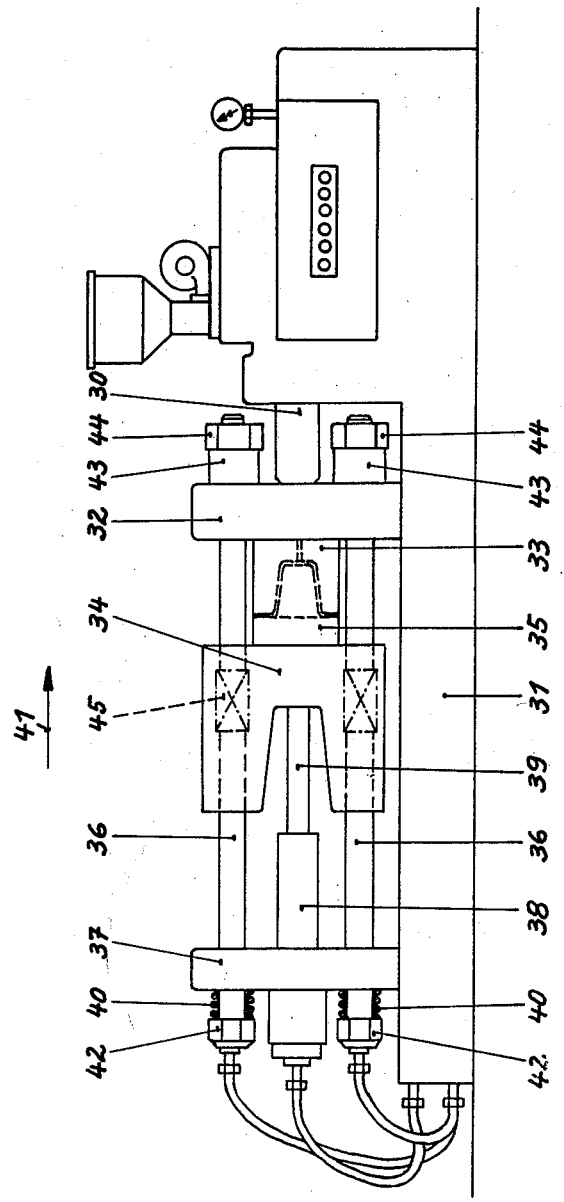
FIG. 5 is an injection moulding machine, similar to that of FIG. 1, but with a different arrangement of pressure pads and a considerably simplified closing member.

The construction of the injection moulding machine and particularly the arrangement of the pressure pad or pads is not restricted to the embodiment shown in FIG. 1, as demonstrated with reference to FIG. 5. Also in this machine, any plasticiser or injection unit may be used, the injection cylinder 30 of which passes through the front mould clamping plate 32 mounted on the base plate 31 and leads into the sprue hole of the charging mould half 33. The mould clamping plate 32 for this mould half is formed by the front crosshead of the mould closing frame, which is completed by the rear crosshead 37, also firmly anchored on the base plate, and by four guide columns 36, connecting these parts. The guide columns 36 are axially displaceably mounted in the front clamping plate 32 and in the rear crosshead 37. These columns 36 are so long that their ends project outwardly by a considerable amount from the mould clamping plate 32 and from the crosshead 37. Over the column ends projecting from the crosshead 37, there are fitted cylindrical compression springs 40, held in position by nuts 42, screwed on to the outer ends of the columns. On the other column ends, projecting through the fixed clamping plate 32, there are fitted pressure pads 43, having the form of annular pistons secured by nuts 44. When the pressure pads 43 are affected by a hydraulic pressure, one side of the pad rests against the outer wall of the fixed mould closing plate 32, and the other side rests against the nuts 44, so that with corresponding lift of the pressure pads, the guide columns 36 may be lifted against the force of the compression springs 40 in the direction of the arrow 41, that is to say, towards the injection unit. The amount of the axial displacement is limited structurally to 15–20 mm. The strength of the compression springs 40 is such that the depressurized pressure pads 43 are returned by the guide columns to their zero position.

The movable mould clamping plate 34, carrying the ejector mould half 35, is slidably located on the guide columns 36, between the fixed clamping plate 32 and the rear crosshead 37, and can be moved through piston rods 39 by means of a displacement cylinder 38 carried by the rear cross-head 37, in order to open and close the mould. However, any other driving arrangement may be used for this purpose. In order to lock the moving mould clamping plate 34 in the mould closing position, there is provided according to the invention the hydraulic fixing device described above, located either in the fixing zone of the mould clamping plate 34 on the guide columns 36, or in the bores of the mould clamping plate 34, adapted to receive the columns 36.

The operation of the machine is as follows:

When the machine is ready for operation, the injection mould 33, 35 is closed by moving the movable mould clamping plate 34. In this closed position, the hydraulic fixing device 45 is operated, causing the mould clamping plate 34 for the ejector mould half 35 to be locked on the guide columns 36. When this locking is completed, the pressure pad 43 is actuated, causing the guide columns 36, with the mould clamping plate 34 clamped thereto, to be moved in the direction of the arrow 41, so that the mould halves 33, 35 between the clamping plates 32, 34 are firmly pressed together. After relieving the pressure pad 43 and opening the mould, the pressure pads are returned to zero position by the springs 40.

What I claim is:

1. An injection molding machine, comprising: a machine frame, guiding columns mounted on the machine frame, a mold-closing plate slidable along the guiding columns, an ejector mold member carried by the slidable mold-closing plate, a fixed mold-clamping plate, a charging mold member carried by the fixed mold-clamping plate, at least one hydraulic pressure pad capable of pushing the ejector mold member against the charging mold member, clamping bushes of highly elastic metal formed with fluid tight spaces interposed between the slidable mold-closing plate and the guiding columns, and means including ducts for forcing fluid under pressure into the said fluidtight spaces to deform said bushes and thereby lock the mold-closing plate in any position on the guiding columns.

2. An injection molding machine as claimed in claim 1, the clamping bushes being embedded in the guiding columns along which the slidable mold-closing plate slides, and the guiding columns being formed with ducts for supplying liquid under pressure to the spaces of the clamping bushes.

3. An injection molding machine as claimed in claim 1, the clamping bushes being embedded in the bores of the slidable mold-closing plate through which the guiding columns extend, and the slidable mold-closing plate being formed with ducts for supplying liquid under pressure to the spaces of the clamping bushes.

4. An injection molding machine as defined in claim 1, in which auxiliary pressure generating means is disposed in said ducts, said auxiliary means being actuated by pressure fluid in said ducts.

5. An injection molding machine as defined in claim 1, in which the fluid pressure for actuating said pad and for actuating said clamping bushes is supplied from a common fluid pressure source, and means for delaying the application of fluid pressure to said pad, whereby said clamping bushes will be actuated to lock said mold closing plate in position prior to actuation of said pad.

6. An injection molding machine as defined in claim 1, in which said clamping bushes are provided with screw threads of rectangular cross-section, said threads engaging corresponding threads on said machine for securing said bushes in place and absorbing axial forces on said bushes.

References Cited by the Examiner

UNITED STATES PATENTS

| | | | |
|---|---|---|---|
| 2,308,403 | 1/43 | Terry et al. | |
| 2,673,227 | 3/54 | Hubert | 269—22 XR |
| 2,689,978 | 9/54 | Roger | 22—92 XR |
| 2,778,865 | 1/57 | Kongsgaarden | 269—22 XR |
| 2,862,238 | 12/58 | Cuzzi | 18—30 |
| 3,120,039 | 2/64 | Stubbe et al. | |

WILLIAM J. STEPHENSON, *Primary Examiner.*

MICHAEL V. BRINDISI, *Examiner.*